(12) United States Patent
Vernacchia et al.

(10) Patent No.: US 7,896,775 B2
(45) Date of Patent: Mar. 1, 2011

(54) CONTROL SYSTEM FOR ELECTRONIC RANGE SELECTION IN A DUAL CLUTCH TRANSMISSION

(75) Inventors: Mark A. Vernacchia, Northville, MI (US); Brian W. Whitmarsh, Commerce, MI (US); Joshua E. Lehrmann, Ann Arbor, MI (US); Wayne B. Vogel, Canton, MI (US); Todd W. Rooney, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 608 days.

(21) Appl. No.: 11/950,483

(22) Filed: Dec. 5, 2007

(65) Prior Publication Data

US 2008/0220939 A1  Sep. 11, 2008

Related U.S. Application Data

(60) Provisional application No. 60/893,882, filed on Mar. 8, 2007.

(51) Int. Cl.
| | |
|---|---|
| *F16H 61/216* | (2006.01) |
| *F16H 61/48* | (2006.01) |
| *F16H 61/00* | (2006.01) |
| *F16H 31/00* | (2006.01) |

(52) U.S. Cl. .................... 477/158; 477/53; 477/164; 475/132

(58) Field of Classification Search ............... 477/53, 477/67, 907, 156, 158, 162, 163, 164; 475/116, 475/131, 132, 133, 134
See application file for complete search history.

(56) References Cited

U.S. PATENT DOCUMENTS

| | | | | |
|---|---|---|---|---|
| 5,433,124 | A * | 7/1995 | Person | 74/335 |
| 5,492,509 | A * | 2/1996 | Goates | 475/131 |
| 5,919,108 | A * | 7/1999 | Takagi | 475/127 |
| 7,654,935 | B2 * | 2/2010 | Tanaka et al. | 477/45 |
| 2002/0086759 | A1 * | 7/2002 | Imai et al. | 475/116 |
| 2005/0003921 | A1 * | 1/2005 | Morise et al. | 475/116 |
| 2008/0216908 | A1 | 9/2008 | Vernacchia et al. | |
| 2008/0220923 | A1 | 9/2008 | Whitmarsh et al. | |

* cited by examiner

*Primary Examiner*—Roger Pang

(57) ABSTRACT

The present invention provides a system for shifting or controlling a dual clutch transmission where the transmission may operate in at least a first mode of operation and a second mode of operation. The system includes a controller and a plurality of solenoids in fluid communication with a valve assembly. Selective activation of the solenoids by the controller engages the valve assembly to provide the first mode and the second mode of operation.

16 Claims, 6 Drawing Sheets

CONTROL SYSTEM FOR ELECTRONIC RANGE SELECTION IN A DUAL CLUTCH TRANSMISSION

CROSS-REFERENCE TO RELATED APPLICATIONS

This application claims the benefit of U.S. Provisional Application No. 60/893,882, filed on Mar. 8, 2007. The disclosure of the above application is incorporated herein by reference.

FIELD

The invention relates generally to a control system in a transmission, and more particularly to a control system for electronic transmission range selection in a dual clutch transmission.

BACKGROUND

The statements in this section merely provide background information related to the present disclosure and may or may not constitute prior art.

A typical multi-speed, dual clutch transmission uses a combination of two friction clutches and several dog clutch/synchronizers to achieve a plurality of forward and reverse gear or speed ratios, a Neutral, and a Park. Selection of speed ratios is typically accomplished by engaging a shift lever or other driver interface device that is connected by a shifting cable or other mechanical connection to the transmission. Alternatively, the selection of speed ratios may be controlled by an electronic transmission range selection (ETRS) system, also known as a "shift by wire" system. In an ETRS system, selection of speed ratios is accomplished through electronic signals communicated between the driver interface device and the transmission. The ETRS system reduces mechanical components, increases instrument panel space, enhances styling options, and eliminates the possibility of shifter cable misalignment with the transmission range selection levers. Accordingly, there is room in the art for a hydraulic control system having an internal ETRS system to control out-of-Park and return to Park functions in a dual clutch transmission.

SUMMARY

The present invention provides a system for shifting or controlling a dual clutch transmission where the transmission may operate in at least a first mode of operation and a second mode of operation. The system includes a controller, a plurality of solenoids, and a valve assembly.

An embodiment of a shift control system of the present invention includes a controller for providing a first control signal and a second control signal, a first solenoid in communication with the controller and having a first port for receiving a first fluid flow and a second port in communication with the first port for selectively receiving the first fluid flow, a second solenoid in communication with the controller and having a first port for receiving a second fluid flow and a second port in communication with the first port for selectively receiving the second fluid flow, and a valve assembly having a valve movably disposed within a valve body. The valve body includes a first inlet port in communication with the second port of the first solenoid, a second inlet port in communication with second port of the second solenoid, a third inlet port for receiving a third fluid flow, a first outlet port in communication with the third inlet port for selectively receiving the third fluid flow, and a second outlet port in communication with the third inlet port for selectively receiving the third fluid flow. The first control signal activates the first solenoid to open such that the second port of the first solenoid receives the first fluid flow and communicates the first fluid flow to the first inlet port of the valve assembly wherein the first fluid flow moves the valve to a first position. The second control signal activates the second solenoid to open such that the second port of the second solenoid receives the second fluid flow and communicates the second fluid flow to the second inlet port of the valve assembly wherein the second fluid flow moves the valve to a second position. The first position of the valve directs the third fluid flow to the first outlet port to shift the transmission to the first mode of operation and the second position of the valve directs the third fluid flow to the second outlet port to shift the transmission to the second mode of operation.

In one aspect of the embodiment of the present invention, the shift control system further includes a third solenoid in communication with the controller and having a first port for receiving a fourth fluid flow and a second port in communication with the first port for selectively receiving the fourth fluid flow, the second port in communication with a fourth inlet port located in the valve body, wherein a third control signal from the controller activates the third solenoid to open such that the second port of the third solenoid receives the fourth fluid flow and communicates the fourth fluid flow to the fourth inlet port of the valve assembly wherein the fourth fluid flow moves the valve to the first position.

In another aspect of the embodiment of the present invention, the third control signal is provided by the controller if the first solenoid does not open when activated by the first control signal.

In yet another aspect of the embodiment of the present invention, the third solenoid is located in a torque converter control subsystem within the transmission.

In yet another aspect of the embodiment of the present invention, the third solenoid is a variable bleed solenoid.

In yet another aspect of the embodiment of the present invention, the first solenoid is an on/off normally low solenoid.

In yet another aspect of the embodiment of the present invention, the second solenoid is an on/off normally low solenoid.

In yet another aspect of the embodiment of the present invention, the system includes an actuating assembly for initiating the first mode of operation and the second mode of operation, the actuating assembly in communication with the first outlet port and the second outlet port, wherein the third fluid flow received from the first outlet port activates the actuating assembly to initiate the first mode of operation and the third fluid flow received from the second outlet port activates the actuating assembly to initiate the second mode of operation.

In yet another aspect of the embodiment of the present invention, the actuating assembly includes a servo mechanism having a piston disposed within a servo body, the servo body having a first inlet port in communication with the first outlet port of the valve assembly and an optional second inlet port in communication with the second outlet port of the valve assembly, wherein the third fluid flow moves the piston within the servo body to a first position when the third fluid flow is communicated from the first outlet port of the valve assembly to the first inlet port of the servo mechanism, and wherein the third fluid flow moves the piston within the servo body to a second position when the third fluid flow is communicated from the second outlet port of the valve assembly to the second inlet port of the servo mechanism, and wherein the first position of the piston initiates the first mode of operation and the second position of the piston initiates the second mode of operation. If the optional second inlet port is not utilized, an exhaust port is connected to the second inlet port of the servo.

In yet another aspect of the embodiment of the present invention, the first mode of operation is an out-of-Park mode and the second mode of operation is a Park mode.

In yet another aspect of the embodiment of the present invention, the system includes a driver interface device in communication with the controller and operable to provide a Park control signal indicative of activating the Park mode and an out-of-Park control signal indicative of activating the out-of-Park mode, and wherein the controller provides the second control signal to initiate the Park mode when the controller receives the Park control signal and wherein the controller provides the first control signal to initiate the out-of-Park mode when the controller receives the out-of-Park control signal.

In yet another aspect of the embodiment of the present invention, the Park control signal, the out-of-Park control signal, the first control signal, and the second control signal are electrical signals.

Another embodiment of a shift control system of the present invention includes a controller for providing a first control signal and a second control signal, a first solenoid in communication with the controller and having a first port for receiving a first fluid flow and a second port in communication with the first port for selectively receiving the first fluid flow, a second solenoid in communication with the controller and having a first port for receiving a second fluid flow and a second port in communication with the first port for selectively receiving the second fluid flow, and a valve assembly having a valve movably disposed within a valve body. The valve body includes a first inlet port in communication with the second port of the first solenoid, a second inlet port in communication with second port of the second solenoid, a third inlet port for receiving a third fluid flow, and an outlet port in communication with the third inlet port for selectively receiving the third fluid flow. The first control signal activates the first solenoid to open such that the second port of the first solenoid receives the first fluid flow and communicates the first fluid flow to the first inlet port of the valve assembly wherein the first fluid flow moves the valve to a first position. The second control signal activates the second solenoid to open such that the second port of the second solenoid receives the second fluid flow and communicates the second fluid flow to the second inlet port of the valve assembly wherein the second fluid flow moves the valve to a second position. The first position of the valve allows the outlet port to receive the third fluid flow to shift the transmission to the first mode of operation and wherein the second position of the valve prevents the outlet port from receiving the third fluid flow to shift the transmission to the second mode of operation.

In one aspect of the embodiment of the present invention, the system includes an actuating assembly in communication with the outlet port of the valve assembly for initiating the first mode of operation and having a biasing member for initiating the second mode of operation, wherein the third fluid flow received from the outlet port activates the actuating assembly to initiate the first mode of operation and wherein the biasing member initiates the second mode of operation when the third fluid flow is not received from the outlet port of the valve assembly.

In another aspect of the embodiment of the present invention, the actuating assembly includes a servo mechanism having a piston engaged by the biasing member and disposed within a servo body and/or attached to the manual shaft, the servo body having an inlet port in communication with the outlet port of the valve assembly, wherein the third fluid flow moves the piston within the servo body to a first position when the third fluid flow is communicated from the outlet port of the valve assembly to the inlet port of the servo mechanism, and wherein the biasing member moves the piston within the servo body to a second position when the third fluid flow is not communicated from the outlet port of the valve assembly to the inlet port of the servo mechanism, and wherein the first position of the piston initiates the first mode of operation and the second position of the piston initiates the second mode of operation.

Yet another embodiment of a shift control system of the present invention includes a controller for providing a first control signal, a second control signal, and a third control signal, a first solenoid in communication with the controller and having a first port for receiving a first fluid flow and a second port in communication with the first port for selectively receiving the first fluid flow, a second solenoid in communication with the controller and having a first port for receiving a second fluid flow and a second port in communication with the first port for selectively receiving the second fluid flow, a third solenoid in communication with the controller and having a first port for receiving a third fluid flow and a second port in communication with the first port for selectively receiving the third fluid flow, and a valve assembly having a valve movably disposed within a valve body. The valve body includes a first inlet port in communication with the second port of the first solenoid, a second inlet port in communication with second port of the second solenoid, a third inlet port in communication with the second port of the third solenoid, and a fourth inlet port for receiving a fourth fluid flow, a first outlet port in communication with the fourth inlet port for selectively receiving the fourth fluid flow, and a second outlet port in communication with the fourth inlet port for selectively receiving the fourth fluid flow. The first control signal activates the first solenoid to open such that the second port of the first solenoid receives the first fluid flow and communicates the first fluid flow to the first inlet port of the valve assembly wherein the first fluid flow moves the valve to a first position. The second control signal activates the second solenoid to open such that the second port of the second solenoid receives the second fluid flow and communicates the second fluid flow to the second inlet port of the valve assembly wherein the second fluid flow moves the valve to a second position. The third control signal activates the third solenoid to open if the first solenoid does not open such that the second port of the third solenoid receives the third fluid flow and communicates the third fluid flow to the third inlet port of the valve assembly wherein the third fluid flow moves the valve to the first position. The first position of the valve directs the fourth fluid flow to the first outlet port to shift the transmission to the first mode of operation and the second position of the valve directs the fourth fluid flow to the second outlet port to shift the transmission to the second mode of operation.

In one aspect of the embodiment of the present invention, the third solenoid is located in a torque converter control subsystem within the transmission.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
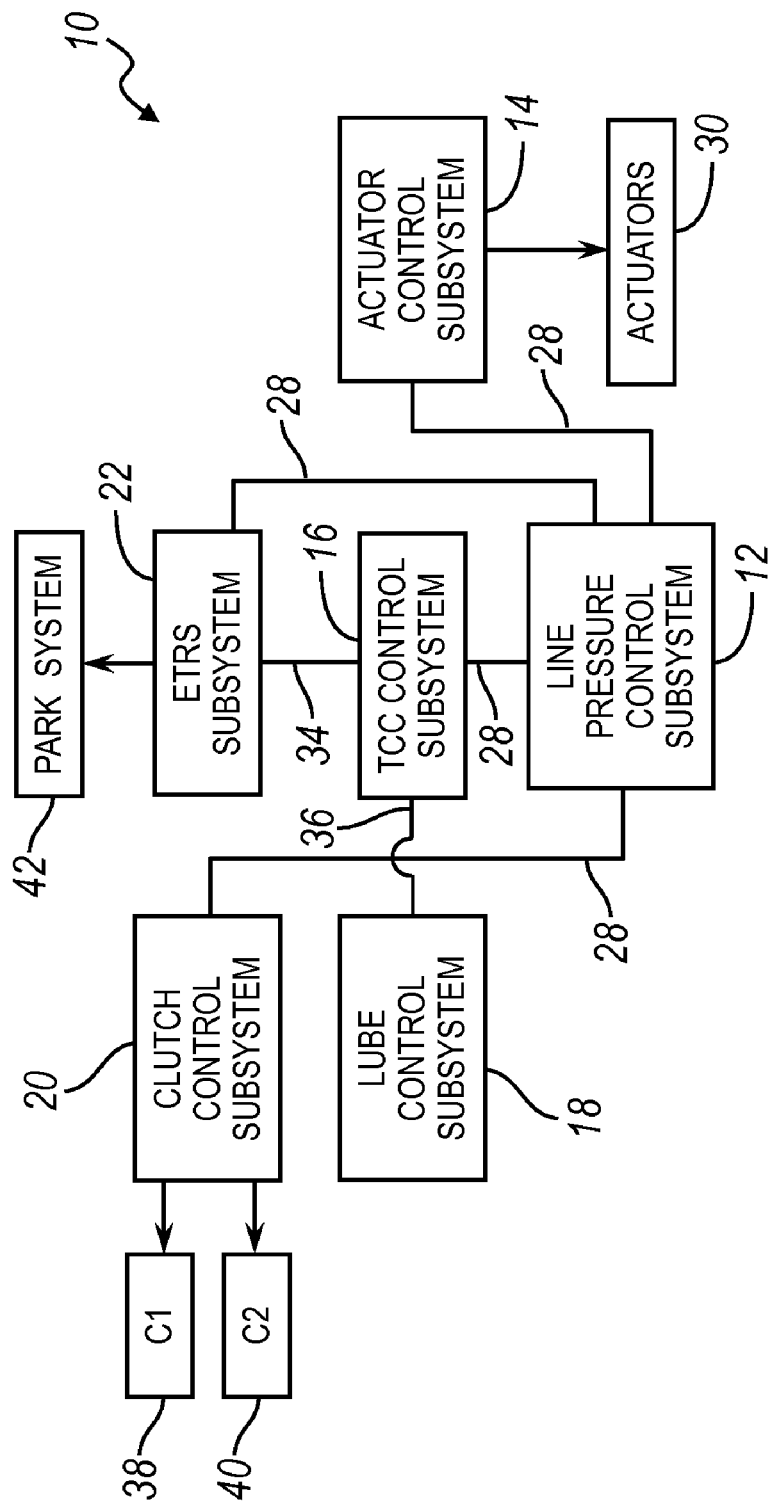
FIG. 1 is a schematic diagram of an embodiment of a hydraulic control system for a dual clutch transmission having an internal electronic transmission range selection subsystem according to the principles of the present invention.

With reference to FIG. 1, a hydraulic control system for use in a dual clutch transmission in a motor vehicle is illustrated schematically and generally indicated by reference number 10. The hydraulic control system 10 includes a plurality of subsystems including a line pressure subsystem 12, an actuator control subsystem 14, a torque converter clutch (TCC) control subsystem 16, a lubrication control subsystem 18, a clutch control subsystem 20, and an electronic transmission range selection (ETRS) subsystem 22. The hydraulic control system 10 is operable to control the dual clutch transmission, as will be described in greater detail below.

The line pressure subsystem 12 is operable to provide and regulate pressurized hydraulic fluid, such as oil, throughout the hydraulic control system 10. Accordingly, the line pressure subsystem 12 may include various components (not shown) such as a hydraulic pump, a fluid source, a line pressure blow-off valve, a line pressure regulator valve, and/or a filter. In the example provided, the line pressure subsystem 12 includes a fluid communication channel or line passage, indicated by reference number 28, which directly provides pressurized hydraulic fluid to the actuator control subsystem 14, the ETRS subsystem 22, the TCC control subsystem 16, and the clutch control subsystem 20. The line passage 28 is illustrated schematically in FIG. 1 as a plurality of separate lines, however it should be appreciated that the line passage 28 may be a single continuous passage or a plurality of linked passages in series or in parallel without departing from the scope of the present invention.

The actuator control subsystem 14 controls the actuation of a plurality of actuators 30 such as synchronizers, clutches, and/or brakes. The actuators 30 are operable to selectively engage a plurality of gear sets (not shown) within the dual clutch transmission to provide a plurality of forward and reverse speed ratios and a Neutral. Accordingly, the actuator control subsystem 14 may include various components (not shown) such as solenoids and valves to actuate or control the actuators 30.

The TCC control subsystem 16 controls the operation of a torque converter (not shown) in the dual clutch transmission. The TCC control subsystem 16 is in direct hydraulic communication with the ETRS subsystem 22 through a fluid passage 34 and with the lubrication control subsystem 18 through a fluid passage 36. The fluid passages 34, 36 may be single channels or a plurality of linked channels in series or in parallel without departing from the scope of the present invention.

The lubrication control subsystem 18 provides lubrication and cooling to a variety of components throughout the dual clutch transmission. For example, the lubrication control subsystem 18 may direct hydraulic fluid through a plurality of fluid passages (not shown) to components that generate heat.

The clutch control subsystem 20 is operable to control a dual clutch assembly that includes a first clutch 38 and a second clutch 40. The clutches 38, 40 may be used to engage one or more countershafts (not shown) within the dual clutch transmission and provide dynamic or "power-on" shifts by alternating engagement between the clutches 38, 40 and the actuator control sub-system 14.

The ETRS subsystem 22 is operable to control a park system 42 upon receipt of electronic control signals, as will be described in further detail below. The park system 42 is operable to provide at least two modes of transmission operation including a first mode or out-of-Park mode and a second mode or Park mode. While in Park mode, the park system 42 prevents the transmission from moving the vehicle by preferably locking an output shaft (not shown) of the transmission. While in out-of-Park mode, the park system 42 is disengaged and the transmission may move the vehicle by engaging any of the forward or reverse speed ratios.

Figure 2:
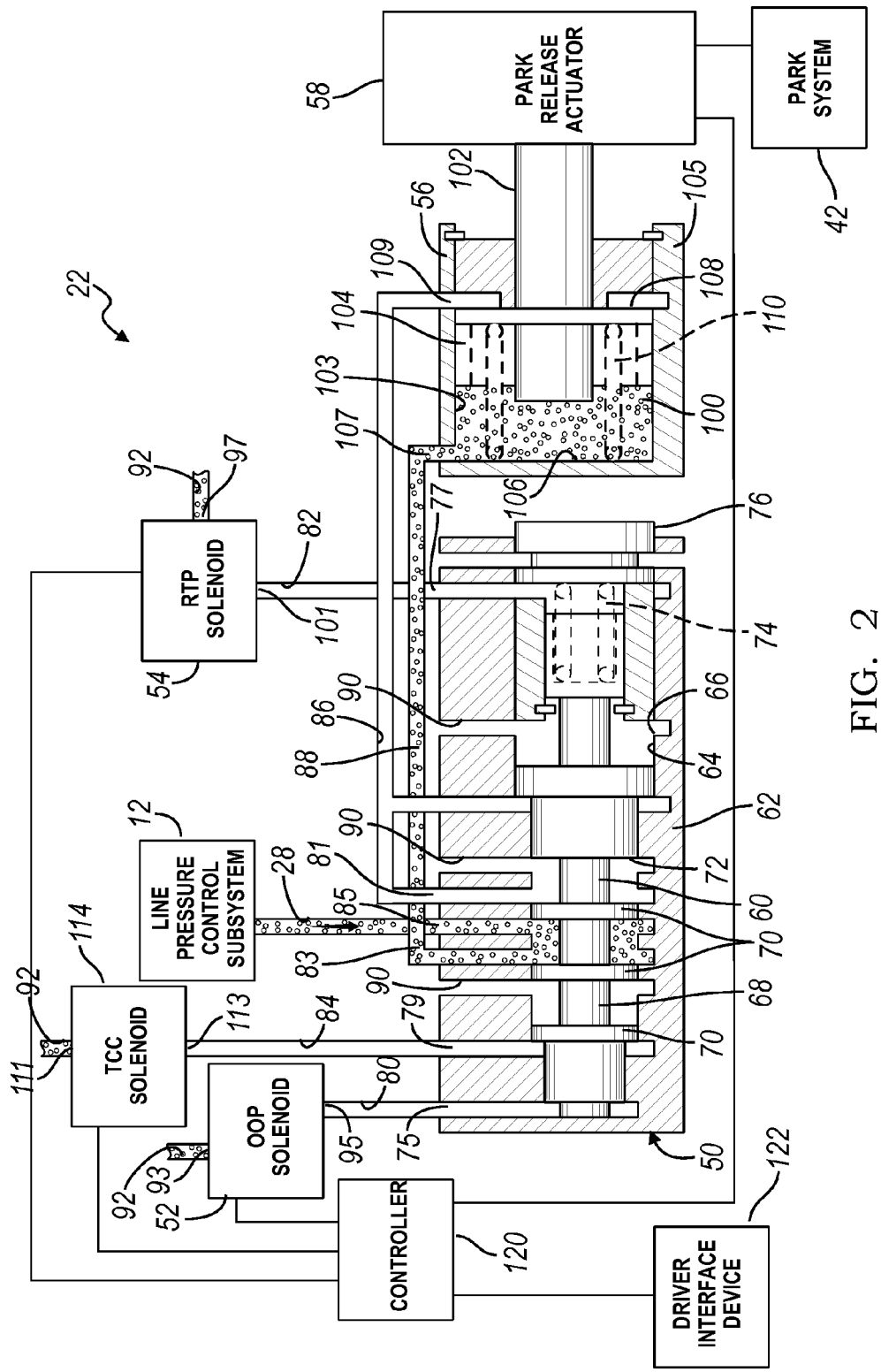
FIG. 2 is a diagrammatic view of an embodiment of the internal electronic range selection subsystem according to the present invention in a cold start park position.
Figure 3:
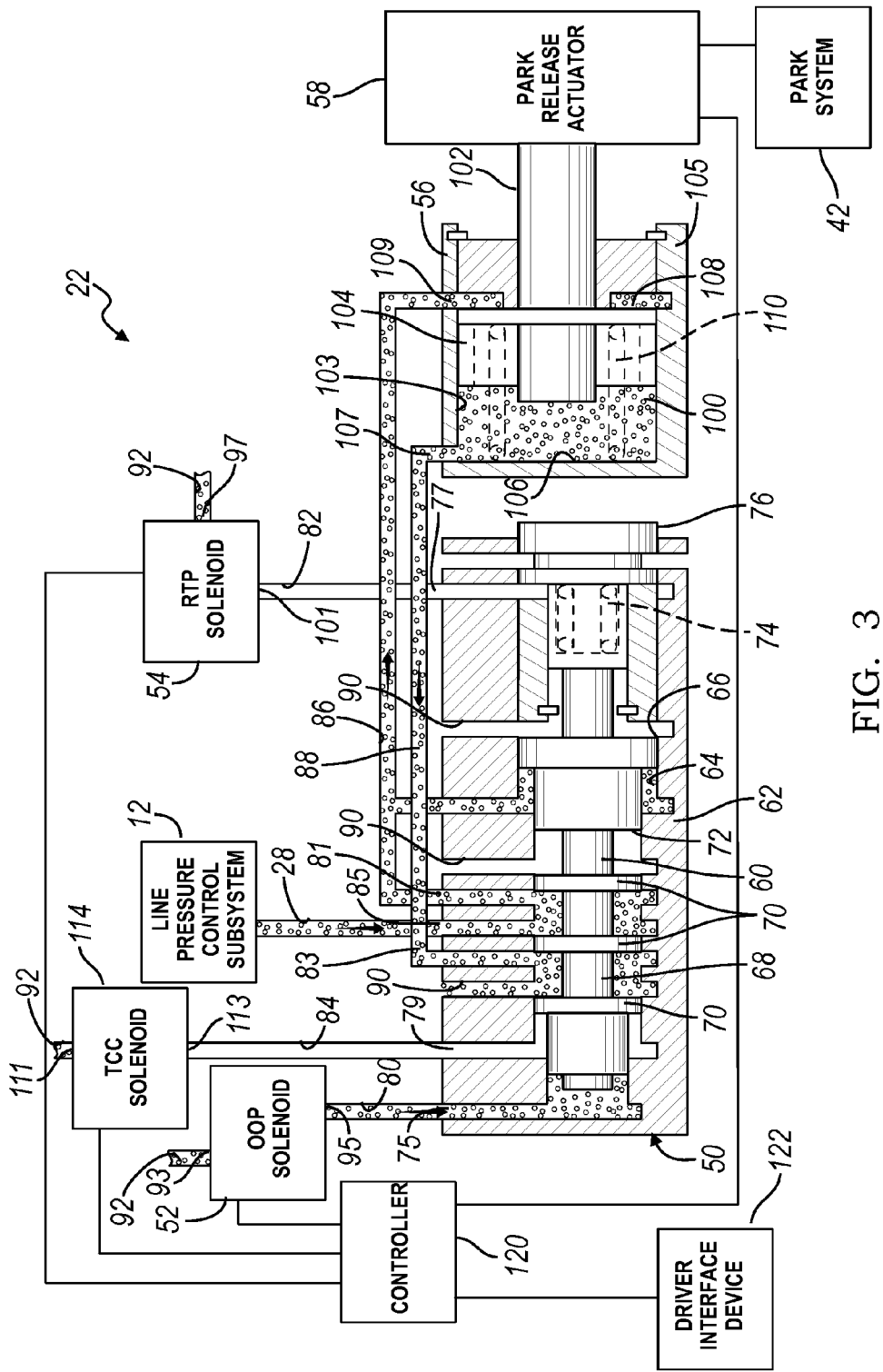
FIG. 3 is a diagrammatic view of an embodiment of the internal electronic range selection subsystem according to the present invention in a out of park command position.

Turning to FIG. 2, the ETRS subsystem 22 will now be described in further detail. The ETRS subsystem 22 generally includes a valve assembly 50, a first solenoid 52, a second solenoid 54, a servo mechanism 56, and a park release actuator 58 that all cooperate to control the park system 42. The valve assembly 50 includes a valve 60 located within a valve body 62. More specifically, the valve body 62 includes a bore 64 that defines a valve chamber 66 and the valve 60 is slidably supported within the valve chamber 66. The valve body 62 is preferably formed as an integral component of the transmission. The valve 60 includes a central body 68 that extends along a length of the valve chamber 66. A plurality of lands 70 extend from the central body 68 and engage the bore 64 of the valve chamber 66. The lands 70 are spaced along the length of the central body 68 and cooperate with the bore 64 of the valve chamber 66 to define a plurality of fluid chambers 72. The valve 60 is moveable within the valve chamber 66 between a Park position, as illustrated in FIG. 2, and an out-of-Park position, as illustrated in FIG. 3. A biasing member 74, such as a spring, is located within the valve chamber 66 between the valve 60 and a seat 76. The seat 76 is fixed relative to the valve body 62. The biasing member 74 biases the valve 60 to the Park position.

The valve body 62 further defines a plurality of ports that connect with a plurality of fluid communication channels or passages. In the example provided, the valve body 62 includes a first inlet port 75 that communicates with the valve chamber 66 at an end of the valve 60 opposite the end of the valve 60 engaged by the biasing member 74. The first inlet port 75 communicates with a first fluid communication channel 80. A second inlet port 77 communicates with the valve chamber 66 at an end of the valve 60 engaged by the biasing member 74.

The second inlet port 77 communicates with a second fluid communication 82 channel. A third inlet port 79 communicates with the valve chamber 66 on an end of the valve 60 proximate or near the first inlet port 75. The third inlet port 79 communicates with a third fluid communication channel 84. A first outlet port 81 communicates with the valve chamber 66 between the second and third inlet ports 77, 79. The first outlet port 81 communicates with a fourth fluid communication channel 86. A second outlet port 83 communicates with the valve chamber 66 between the third inlet port 79 and the first outlet port 81. The second outlet port 83 communicates a fifth fluid communication channel 88. The valve body 62 also defines a fourth inlet port 85 located between the outlet ports 81, 83 that communicates with the line channel 28. As described in FIG. 1, the line channel 28 is in communication with the line pressure control subsystem 12 and provides a third fluid flow to the fourth inlet port 85. Finally, a plurality of exhaust channels 90 communicate with the valve chamber 66 at various locations along the length of the valve chamber 66. It should be appreciated that various other arrangements of fluid communication channels and ports may be employed without departing from the scope of the present invention.

The first solenoid 52, or out-of-Park solenoid, is employed to initiate the park system 42 to move to the out-of-Park mode, as will be described in further detail below. The first solenoid 52 generally includes a first fluid port 93 in fluid communication with the pressure regulated line channel 92 and a second fluid port 95 in fluid communication with the first fluid communication channel 80. The pressure regulated line channel 92 delivers pressurized hydraulic fluid from the line pressure subsystem 12 (FIG. 1) to the first solenoid 52. The first solenoid 52 is operable to selectively open to allow a first fluid flow from the pressure regulated line channel 92 to pass from the first fluid port 93 through the first solenoid 52 to the second fluid port 95 and to enter the first fluid communication channel 80. The first solenoid 52 is preferably an on/off solenoid that either fully opens or closes and that is normally low or closed when not energized by a power source.

The second solenoid 54, or return-to-Park solenoid, is employed to initiate the park system 42 to move to the Park mode, as will be described in further detail below. The second solenoid 54 generally includes a first fluid port 97 in fluid communication with the pressure regulated line channel 92 and a second fluid port 101 in fluid communication with the second fluid communication channel 82. The pressure regulated line channel 92 delivers pressurized hydraulic fluid from the pump system 12 to the second solenoid 54. The second solenoid 54 is operable to selectively open to allow a second fluid flow from the pressure regulated line channel 92 to pass from the first fluid port 97 through the second solenoid 54 to the second fluid port 101 and to enter the second fluid communication channel 82. The second solenoid 54 is preferably an on/off solenoid that either fully opens or closes and that is normally low or closed when not energized by a power source.

Figure 4:
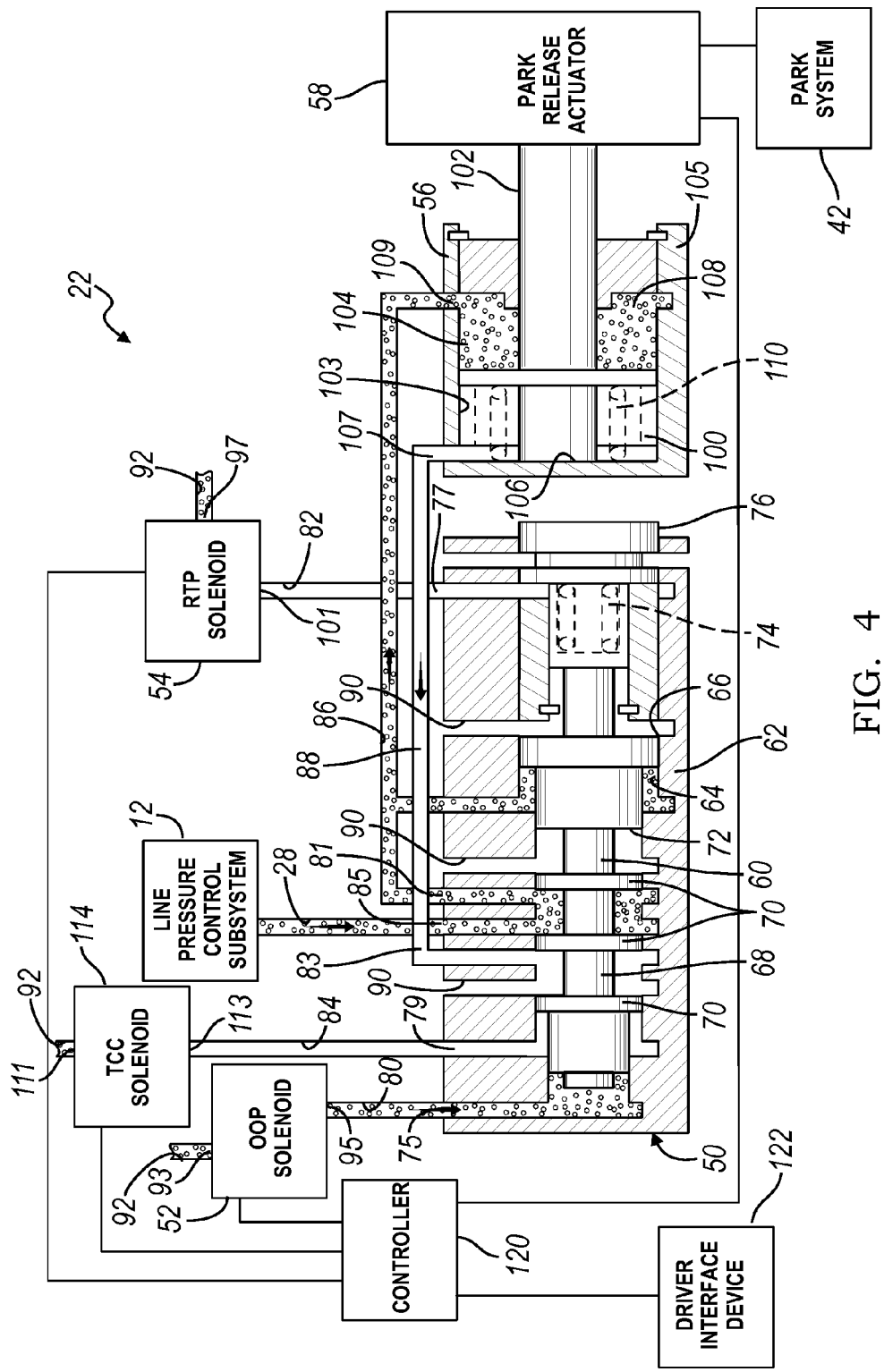
FIG. 4 is a diagrammatic view of an embodiment of the internal electronic range selection subsystem according to the present invention in an out of park position.

The servo mechanism 56 is operable to translate hydraulic fluid pressure communicated through the valve assembly 50 into mechanical movement or translation of the park release actuator 58. Accordingly, the servo mechanism 56 in the example provided is located within a cylinder 100 defined by a bore 103 of a servo body 105. The servo mechanism 56 preferably includes a servo pin 102 coupled to a piston head 104 slidably supported within the cylinder 100. The piston head 104 is sealingly engaged with the bore 103 of the servo body 105. The piston head 104 cooperates with the bore 103 to define a first fluid chamber 106 and to define a second fluid chamber 108 located on an opposite side of the piston head 104 than the first fluid chamber 106. The servo body 105 defines an inlet port 107 that communicates with the first fluid chamber 106 and an inlet port 109 that communicates with the second fluid chamber 108. The inlet port 107 communicates with the fifth fluid communication channel 88 and the inlet port 109 communicates with the fourth fluid communication channel 86. The piston head 104 and the servo pin 102 are slidable between a Park position, as illustrated in FIG. 2, and an out-of-Park position, as illustrated in FIG. 4. A biasing mechanism 110, such as a spring, engages the piston head 104 and biases the piston head 104 and servo pin 102 into the Park position.

The park release actuator 58 is coupled to the servo pin 102 of the servo mechanism 56 and is operable to engage the park system 42. Movement of the servo pin 102 of the servo mechanism 56 in turn actuates the park release actuator 58, as will be described in further detail below. The park release actuator 58 may include switches and sensors employed to determine the operating mode of the park system 42 and may be in communication with the controller 120.

The ETRS subsystem 22 further includes a fail-safe feature using a third solenoid 114 that generally includes a first fluid port 111 in fluid communication with the pressure regulated line channel 92 and a second fluid port 113 in fluid communication with the third fluid communication channel 84. The pressure regulated line channel 92 delivers pressurized hydraulic fluid from the pump system 12 to the third solenoid 114. The third solenoid 114 is operable to selectively open to allow a fourth fluid flow from the pressure regulated line channel 92 to pass from the first fluid port 111 through the third solenoid 114 to the second fluid port 113 and to enter the third fluid communication channel 84. The third solenoid 114 is preferably a variable bleed, normally low or closed, torque converter clutch regulator solenoid that is part of the TCC control subsystem 16.

A controller 120 is in electronic communication with various components of the hydraulic control system 10 including the solenoids 52, 54, 114 and the park release actuator 58. The controller 120 may be a transmission control module or an engine control module and is preferably an electronic device having a preprogrammed digital computer or processor, control logic, memory used to store data, and at least one I/O peripheral. The control logic includes a plurality of logic routines for monitoring, manipulating, and generating data. However, various other types of controllers may be employed without departing from the scope of the present invention. The controller 120 receives input signals from a driver interface device 122 such as a shift lever. The input signals are indicative of the desired operating mode of the transmission. In the example of an automatic transmission, the desired operating modes may be Drive, Neutral, Reverse, Park, etc., or Park and out-of-Park. The controller 120 then electronically communicates with the hydraulic control system 10, including the solenoids 52, 54, 114, using a plurality of control signals to initiate the desired transmission operating mode according to the signals communicated from the driver interface device 122.

For example, FIG. 2 illustrates the ETRS subsystem 22 in a cold start Park mode or condition wherein the driver interface device 122 is in a Park condition, the park system 42 is in the Park mode, and the motor vehicle has just been started. In this condition, the valve 60 is in the Park position, and the third fluid flow from the line channel 28 pumped from the line pressure control subsystem 12 is directed through a fluid chamber 72 in the valve assembly 50, into the fifth fluid communication channel 88, and on into the first fluid chamber 106. The third fluid flow in the first fluid chamber 106 acts against the piston 104 along with the biasing member 110 to position the servo mechanism 56 to the Park position. The Park position of the servo mechanism 56 in turn mechanically positions the park release actuator 58 to keep the park system 42 in the Park mode.

When the driver interface device 122 signals to the controller 120 to move out-of-Park, the controller 120 electronically communicates with the out-of-Park solenoid 52 and signals the out-of-Park solenoid 52 to open. The return to park solenoid 54 remains closed. The first fluid flow passes through the out-of-Park solenoid 52 and into the first fluid communication channel 80 and into the valve assembly 50. The first fluid flow acts against the valve 60 and moves the valve 60 into the out-of-Park position, as is illustrated in FIG. 3. The third fluid flow from the line channel 28 is diverted by a land 70 in the valve assembly 50 from the fifth fluid communication channel 88 to the fourth fluid communication channel 86. The third fluid flow travels through the fourth fluid communication channel 86 to the second fluid chamber 108 in the servo mechanism 56. Additionally, hydraulic fluid remaining in the fifth fluid communication channel 88 exits the ETRS subsystem 22 through one of the exhaust channels 90.

The third fluid flow in the second fluid chamber 108 acts against the piston 104 and moves the servo mechanism 56 into the out-of-Park position, as illustrated in FIG. 4. The servo mechanism 56 mechanically engages the park release actuator 58 which mechanically actuates the park system 42 and moves the park system 42 from the Park mode to the out-of-Park mode. This allows the transmission to provide forward gear ratios, neutral, and/or reverse.

Figure 5:
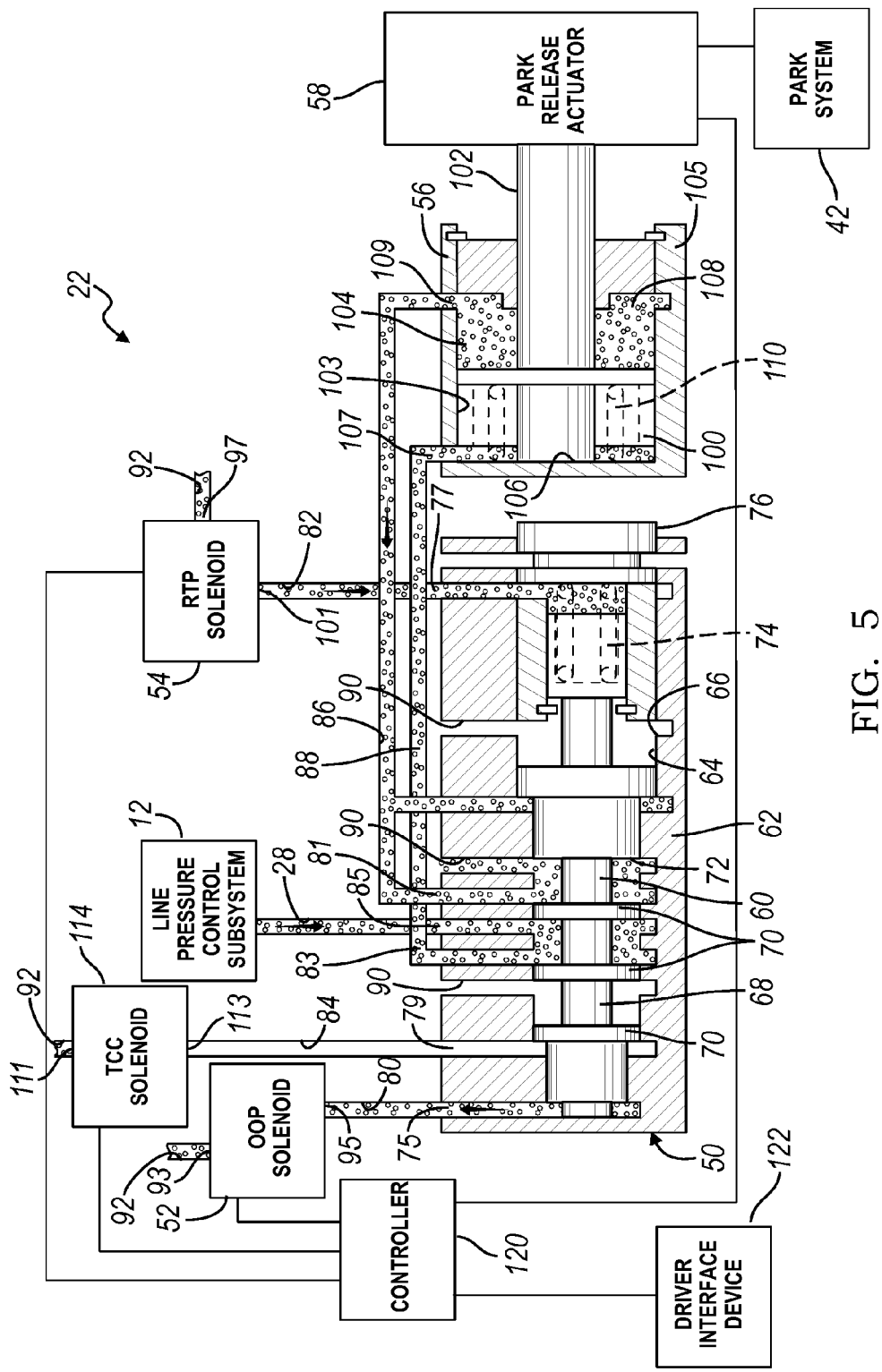
FIG. 5 is a diagrammatic view of an embodiment of the internal electronic range selection subsystem according to the present invention in a return to park command position.

When the driver interface device 122 signals to the controller 120 to return to park, the controller 120 electronically communicates with the out-of-Park solenoid 52 and signals the out-of-Park solenoid 52 to close and electronically communicates with the return to Park solenoid 54 and signals the return to Park solenoid 54 to open. Accordingly, the second fluid flow passes from the pressure regulated line channel 92 through the return to Park solenoid 54 and into the second fluid communication channel 82 and into the valve assembly 50. The second fluid flow acts against the valve 60 and moves the valve 60 back into the Park position, as illustrated in FIG. 5. The third fluid flow from the line channel 28 is diverted by a land 70 in the valve assembly 50 from the fourth fluid communication channel 86 back to the fifth fluid communication channel 88. The third fluid flow travels through the fifth fluid communication channel 88 to the first fluid chamber 106 in the servo mechanism 56. Additionally, hydraulic fluid remaining in the fourth fluid communication channel 86 exits the ETRS subsystem 22 through one of the exhaust channels 90.

Figure 6:
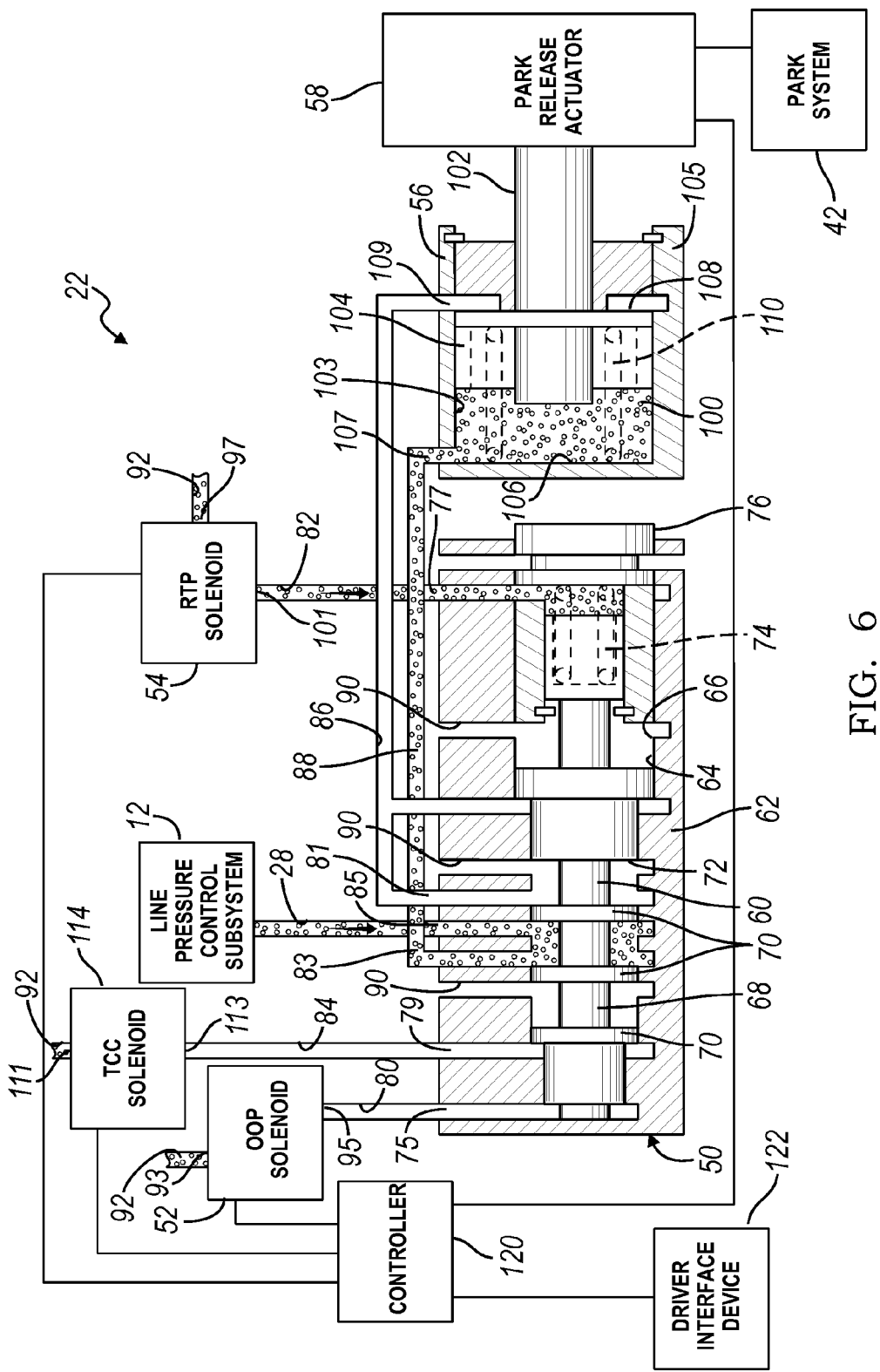
FIG. 6 is a diagrammatic view of an embodiment of the internal electronic range selection subsystem according to the present invention in a park position.

The third fluid flow in the first fluid chamber 106 acts against the piston 104 and moves the servo mechanism 56 back into the Park position, as illustrated in FIG. 6. The servo mechanism 56 mechanically engages the park release actuator 58 which mechanically actuates the park system 42 and moves the park system 42 from the out-of-Park mode to the Park mode. This prevents the transmission from providing forward gear ratios, neutral, and/or reverse.

In the event of a failure of the out-of-Park solenoid 52, the controller 120 may signal the TCC regulator solenoid 114 to open such that the fourth fluid flow passes from the pressure regulated line channel 92 through the TCC regulator solenoid 114 and into the third fluid communication channel 84 and into the valve assembly 50. The fourth fluid flow acts against the valve 60 and is operable to move the valve 60 into the out-of-Park position.

In an alternate embodiment of the ETRS subsystem 22, the servo mechanism does not contain the two fluid chambers 106 and 108, and instead utilizes a single fluid chamber 108. In this case, the inlet port 107 is connected directly to an exhaust thereby eliminating fluid communication channel 88. Accordingly, a shorter valve 60 may be employed.

The description of the invention is merely exemplary in nature and variations that do not depart from the gist of the invention are intended to be within the scope of the invention. Such variations are not to be regarded as a departure from the spirit and scope of the invention.

The invention claimed is:

1. A shift control system for a dual clutch transmission having a first mode of operation and a second mode of operation, the shift control system comprising:

a controller for providing a first control signal and a second control signal;

a first solenoid in communication with the controller and having a first port for receiving a first fluid flow and a second port in communication with the first port for selectively receiving the first fluid flow;

a second solenoid in communication with the controller and having a first port for receiving a second fluid flow and a second port in communication with the first port for selectively receiving the second fluid flow; and a valve assembly having a valve movably disposed within a valve body, the valve body having a first inlet port in communication with the second port of the first solenoid, a second inlet port in communication with second port of the second solenoid, a third inlet port for receiving a third fluid flow, a first outlet port in communication with the third inlet port for selectively receiving the third fluid flow, and a second outlet port in communication with the third inlet port for selectively receiving the third fluid flow;

wherein the first control signal activates the first solenoid to open such that the second port of the first solenoid receives the first fluid flow and communicates the first fluid flow to the first inlet port of the valve assembly wherein the first fluid flow moves the valve to a first position, and wherein the second control signal activates the second solenoid to open such that the second port of the second solenoid receives the second fluid flow and communicates the second fluid flow to the second inlet port of the valve assembly wherein the second fluid flow moves the valve to a second position; and wherein the first position of the valve directs the third fluid flow to the first outlet port to shift the transmission to the first mode of operation, wherein the second position of the valve directs the third fluid flow to the second outlet port to shift the transmission to the second mode of operation, and wherein the first mode of operation is an out-of-Park mode and the second mode of operation is a Park mode.

2. The shift control system of claim 1 further comprising a third solenoid in communication with the controller and having a first port for receiving a fourth fluid flow and a second port in communication with the first port for selectively receiving the fourth fluid flow, the second port in communication with a fourth inlet port located in the valve body, wherein a third control signal from the controller activates the third solenoid to open such that the second port of the third solenoid receives the fourth fluid flow and communicates the fourth fluid flow to the fourth inlet port of the valve assembly wherein the fourth fluid flow moves the valve to the first position.

3. The shift control system of claim 2 wherein the third control signal is provided by the controller if the first solenoid does not open when activated by the first control signal.

4. The shift control system of claim 3 wherein the third solenoid is located in a torque converter control subsystem within the transmission.

5. The shift control system of claim 4 wherein the third solenoid is a variable bleed solenoid.

6. The shift control system of claim 5 wherein the first solenoid is an on/off normally low solenoid.

7. The shift control system of claim 6 wherein the second solenoid is an on/off normally low solenoid.

8. The shift control system of claim 1 further comprising an actuating assembly for initiating the first mode of operation and the second mode of operation, the actuating assembly in communication with the first outlet port and the second outlet port, wherein the third fluid flow received from the first outlet port activates the actuating assembly to initiate the first mode of operation and the third fluid flow received from the second outlet port activates the actuating assembly to initiate the second mode of operation.

9. The shift control system of claim 8 wherein the actuating assembly includes a servo mechanism having a piston disposed within a servo body, the servo body having a first inlet port in communication with the first outlet port of the valve assembly and a second inlet port in communication with the second outlet port of the valve assembly, wherein the third fluid flow moves the piston within the servo body to a first position when the third fluid flow is communicated from the first outlet port of the valve assembly to the first inlet port of the servo mechanism, and wherein the third fluid flow moves the piston within the servo body to a second position when the third fluid flow is communicated from the second outlet port of the valve assembly to the second inlet port of the servo mechanism, and wherein the first position of the piston initiates the first mode of operation and the second position of the piston initiates the second mode of operation.

10. The shift control system of claim 1 further comprising a driver interface device in communication with the controller and operable to provide a Park control signal indicative of activating the Park mode and an out-of-Park control signal indicative of activating the out-of-Park mode, and wherein the controller provides the second control signal to initiate the Park mode when the controller receives the Park control signal and wherein the controller provides the first control signal to initiate the out-of-Park mode when the controller receives the out-of-Park control signal.

11. The shift control device of claim 10 wherein the Park control signal, the out-of-Park control signal, the first control signal, and the second control signal are electrical signals.

12. A shift control system for a dual clutch transmission having a first mode of operation and a second mode of operation, the shift control system comprising:
 a controller for providing a first control signal and a second control signal;
 a first solenoid in communication with the controller and having a first port for receiving a first fluid flow and a second port in communication with the first port for selectively receiving the first fluid flow;
 a second solenoid in communication with the controller and having a first port for receiving a second fluid flow and a second port in communication with the first port for selectively receiving the second fluid flow; and
 a valve assembly having a valve movably disposed within a valve body, the valve body having a first inlet port in communication with the second port of the first solenoid, a second inlet port in communication with second port of the second solenoid, a third inlet port for receiving a third fluid flow, and an outlet port in communication with the third inlet port for selectively receiving the third fluid flow;
 wherein the first control signal activates the first solenoid to open such that the second port of the first solenoid receives the first fluid flow and communicates the first fluid flow to the first inlet port of the valve assembly wherein the first fluid flow moves the valve to a first position, and wherein the second control signal activates the second solenoid to open such that the second port of the second solenoid receives the second fluid flow and communicates the second fluid flow to the second inlet port of the valve assembly wherein the second fluid flow moves the valve to a second position; and
 wherein the first position of the valve allows the outlet port to receive the third fluid flow to shift the transmission to the first mode of operation, wherein the second position of the valve prevents the outlet port from receiving the third fluid flow to shift the transmission to the second mode of operation, and wherein the first mode of operation is an out-of-Park mode and the second mode of operation is a Park mode.

13. The shift control system of claim 12 further comprising an actuating assembly in communication with the outlet port of the valve assembly for initiating the first mode of operation and having a biasing member for initiating the second mode of operation, wherein the third fluid flow received from the outlet port activates the actuating assembly to initiate the first mode of operation and wherein the biasing member initiates the second mode of operation when the third fluid flow is not received from the outlet port of the valve assembly.

14. The shift control system of claim 13 wherein the actuating assembly includes a servo mechanism having a piston engaged by the biasing member and disposed within a servo body, the servo body having an inlet port in communication with the outlet port of the valve assembly, wherein the third fluid flow moves the piston within the servo body to a first position when the third fluid flow is communicated from the outlet port of the valve assembly to the inlet port of the servo mechanism, and wherein the biasing member moves the piston within the servo body to a second position when the third fluid flow is not communicated from the outlet port of the valve assembly to the inlet port of the servo mechanism, and wherein the first position of the piston initiates the first mode of operation and the second position of the piston initiates the second mode of operation.

15. A shift control system for a dual clutch transmission having a first mode of operation and a second mode of operation, the shift control system comprising:
 a controller for providing a first control signal, a second control signal, and a third control signal;
 a first solenoid in communication with the controller and having a first port for receiving a first fluid flow and a second port in communication with the first port for selectively receiving the first fluid flow;
 a second solenoid in communication with the controller and having a first port for receiving a second fluid flow and a second port in communication with the first port for selectively receiving the second fluid flow;
 a third solenoid in communication with the controller and having a first port for receiving a third fluid flow and a second port in communication with the first port for selectively receiving the third fluid flow; and
 a valve assembly having a valve movably disposed within a valve body, the valve body having a first inlet port in communication with the second port of the first solenoid, a second inlet port in communication with second port of the second solenoid, a third inlet port in communication with the second port of the third solenoid, and a fourth inlet port for receiving a fourth fluid flow, a first outlet port in communication with the fourth inlet port for selectively receiving the fourth fluid flow, and a second outlet port in communication with the fourth inlet port for selectively receiving the fourth fluid flow;

wherein the first control signal activates the first solenoid to open such that the second port of the first solenoid receives the first fluid flow and communicates the first fluid flow to the first inlet port of the valve assembly wherein the first fluid flow moves the valve to a first position, and wherein the second control signal activates the second solenoid to open such that the second port of the second solenoid receives the second fluid flow and communicates the second fluid flow to the second inlet port of the valve assembly wherein the second fluid flow moves the valve to a second position, and wherein the third control signal activates the third solenoid to open if the first solenoid does not open such that the second port of the third solenoid receives the third fluid flow and communicates the third fluid flow to the third inlet port of the valve assembly wherein the third fluid flow moves the valve to the first position; and wherein the first position of the valve directs the fourth fluid flow to the first outlet port to shift the transmission to the first mode of operation and wherein the second position of the valve directs the fourth fluid flow to the second outlet port to shift the transmission to the second mode of operation.

16. The shift control system of claim 15 wherein the third solenoid is located in a torque converter control subsystem within the transmission.

* * * * *